(12) United States Patent
Cannon et al.

(10) Patent No.: US 7,595,567 B1
(45) Date of Patent: *Sep. 29, 2009

(54) THERMOSTAT DEVICE WITH LINE UNDER FREQUENCY DETECTION AND LOAD SHEDDING CAPABILITY

(75) Inventors: Joel R. Cannon, Minneapolis, MN (US); William R. Ockert, Cathay, ND (US); Robert Cox, Carrington, ND (US); Kevin Allmaras, Carrington, ND (US)

(73) Assignee: Cannon Technologies/Cooper Power, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/811,144

(22) Filed: Jun. 8, 2007

Related U.S. Application Data

(62) Division of application No. 10/824,825, filed on Apr. 15, 2004, now Pat. No. 7,242,114.

(60) Provisional application No. 60/485,435, filed on Jul. 8, 2003.

(51) Int. Cl.
H02J 3/14 (2006.01)
(52) U.S. Cl. ........................................ 307/29
(58) Field of Classification Search ............... 307/129, 307/29
See application file for complete search history.

(56) References Cited

U.S. PATENT DOCUMENTS 3,558,911 A 1/1971 Muchuan
3,683,343 A 8/1972 Feldman et al.
3,993,984 A 11/1976 Penrod (Continued)

FOREIGN PATENT DOCUMENTS

EP 00 593 225 4/1997

(Continued)

OTHER PUBLICATIONS

Product Bulletin ESPT-2., Cannon Technologies, Inc., *ExpressStat Programmable Demand Response Thermostat*, 2002. pp. 2.

(Continued)

*Primary Examiner*—Robert L. DeBeradinis
(74) *Attorney, Agent, or Firm*—Patterson, Thuente, Skaar & Christensen, P.A.

(57) ABSTRACT

An under frequency protection thermostat-type device includes a thermostat-type housing, a transformer, a line under frequency (LUF) detection and measurement module, a microcontroller, and a load switch. The transformer is adapted to be electrically connected to a primary voltage source having a predefined frequency level and disposed within the housing. The LUF detection and measurement module is electrically connected to the transformer and adapted to detect a line under frequency condition from a signal received from the transformer. The microcontroller is connected to the LUF detection and measurement module and is adapted to send a command to disengage and engage an electrical load as a function of a measured frequency of the voltage source over a predefined period of time. The measured frequency is compared to a predefined frequency threshold. The load switch is connected to the microcontroller and is adapted to respond to a command from the microcontroller to disengage and engage an electrical load from the voltage source.

6 Claims, 13 Drawing Sheets

U.S. PATENT DOCUMENTS

| | | | |
|---|---|---|---|
| D248,838 S | 8/1978 | Pasquarette et al. |
| 4,156,280 A | 5/1979 | Griess |
| 4,190,800 A | 2/1980 | Kelly, Jr. et al. |
| 4,228,511 A | 10/1980 | Simcoe et al. |
| 4,341,345 A | 7/1982 | Hammer et al. |
| 4,345,162 A | 8/1982 | Hammer et al. |
| 4,371,947 A | 2/1983 | Fujisawa |
| 4,389,577 A | 6/1983 | Anderson et al. |
| 4,390,876 A | 6/1983 | Bjorklund et al. |
| D270,815 S | 10/1983 | Odom |
| 4,415,943 A | 11/1983 | Wortman |
| 4,464,724 A | 8/1984 | Gurr et al. |
| 4,551,812 A | 11/1985 | Gurr et al. |
| 4,583,090 A | 4/1986 | Eden et al. |
| 4,620,283 A | 10/1986 | Butt et al. |
| 4,635,214 A | 1/1987 | Kasai et al. |
| 4,657,179 A | 4/1987 | Aggers et al. |
| 4,672,501 A | 6/1987 | Bilac et al. |
| 4,708,910 A | 11/1987 | Forss |
| 4,780,910 A | 10/1988 | Huddleston et al. |
| 4,804,938 A | 2/1989 | Rouse et al. |
| 4,819,180 A | 4/1989 | Hedman et al. |
| 4,845,685 A * | 7/1989 | Wechsler et al. | 367/97 |
| 4,902,964 A | 2/1990 | Szabela et al. |
| 5,099,348 A | 3/1992 | Huddleston et al. |
| 5,197,668 A | 3/1993 | Ratz et al. |
| 5,203,497 A | 4/1993 | Ratz et al. |
| 5,210,712 A * | 5/1993 | Saito | 708/819 |
| 5,218,552 A | 6/1993 | Stirk et al. |
| 5,319,296 A | 6/1994 | Patel |
| 5,414,640 A | 5/1995 | Seem |
| 5,426,620 A | 6/1995 | Budney |
| 5,462,225 A | 10/1995 | Massara et al. |
| 5,475,609 A | 12/1995 | Apothaker |
| 5,502,339 A | 3/1996 | Hartig |
| 5,519,622 A | 5/1996 | Chasek |
| 5,576,700 A | 11/1996 | Davis et al. |
| 5,619,121 A | 4/1997 | Trainor |
| 5,640,153 A | 6/1997 | Hildebrand et al. |
| 5,675,503 A | 10/1997 | Moe et al. |
| 5,687,139 A | 11/1997 | Budney |
| 5,696,695 A | 12/1997 | Ehlers et al. |
| 5,761,083 A | 6/1998 | Brown et al. |
| 5,936,817 A * | 8/1999 | Matsko et al. | 361/72 |
| 6,029,092 A | 2/2000 | Stein |
| 6,098,893 A | 8/2000 | Berglund et al. |
| 6,157,874 A | 12/2000 | Cooley et al. |
| 6,167,389 A | 12/2000 | Davis et al. |
| 6,181,985 B1 | 1/2001 | O'Donnell et al. |
| 6,208,905 B1 | 3/2001 | Giddings et al. |
| 6,254,009 B1 | 7/2001 | Proffitt et al. |
| 6,264,110 B1 | 7/2001 | Proffitt et al. |
| 6,305,611 B1 | 10/2001 | Proffitt et al. |
| 6,314,378 B1 | 11/2001 | Hodge et al. |
| 6,356,426 B1 | 3/2002 | Dougherty |
| 6,377,874 B1 | 4/2002 | Ykema |
| 6,480,803 B1 | 11/2002 | Pierret et al. |
| 6,496,342 B1 | 12/2002 | Horvath et al. |
| 6,509,841 B1 | 1/2003 | Colton et al. |
| 6,512,966 B2 | 1/2003 | Lof et al. |
| 6,519,509 B1 | 2/2003 | Nierlich et al. |
| 6,574,581 B1 | 6/2003 | Bohrer et al. |
| 6,622,926 B1 | 9/2003 | Sartain et al. |
| 6,634,566 B2 | 10/2003 | Archacki, Jr. et al. |
| 6,671,586 B2 | 12/2003 | Davis et al. |
| 6,681,154 B2 | 1/2004 | Nierlich et al. |
| 6,745,106 B2 | 6/2004 | Howard et al. |
| 6,747,571 B2 | 6/2004 | Fierro et al. |
| 6,789,739 B2 | 9/2004 | Rosen |
| 6,806,446 B1 | 10/2004 | Neale |
| 6,816,350 B1 | 11/2004 | Hoopes |
| 6,828,695 B1 | 12/2004 | Hansen |
| 6,891,478 B2 | 5/2005 | Gardner |
| 6,975,926 B2 | 12/2005 | Schanin |
| 6,975,958 B2 | 12/2005 | Bohrer et al. |
| 7,010,363 B2 | 3/2006 | Donnelly et al. |
| 7,136,725 B1 | 11/2006 | Paciorek et al. |
| 7,163,158 B2 | 1/2007 | Rossi et al. |
| 7,172,132 B2 | 2/2007 | Proffitt et al. |
| 7,216,015 B2 | 5/2007 | Poth |
| 7,222,111 B1 | 5/2007 | Budike, Jr. |
| 7,242,114 B1 | 7/2007 | Cannon |
| 7,292,114 B2 | 11/2007 | Greenberg |
| 7,346,467 B2 | 3/2008 | Bohrer et al. |
| 7,355,301 B2 | 4/2008 | Ockert |
| 2002/0087234 A1 | 7/2002 | Lof et al. |
| 2002/0103655 A1 | 8/2002 | Boies et al. |
| 2002/0138176 A1 | 9/2002 | Davis et al. |
| 2003/0150925 A1 | 8/2003 | Archacki, Jr. et al. |
| 2003/0158632 A1 | 8/2003 | Nierlich et al. |
| 2004/0255601 A1 | 12/2004 | Kwon et al. |
| 2005/0097905 A1 | 5/2005 | Kwon et al. |
| 2005/0143865 A1 | 6/2005 | Gardner |
| 2006/0036349 A1 | 2/2006 | Kates |
| 2006/0036350 A1 | 2/2006 | Bohrer et al. |
| 2006/0283964 A1 | 12/2006 | Garozzo |
| 2006/0283965 A1 | 12/2006 | Mueller et al. |
| 2007/0021874 A1 | 1/2007 | Rognli et al. |
| 2008/0133065 A1 | 6/2008 | Cannon et al. |

FOREIGN PATENT DOCUMENTS

| | | |
|---|---|---|
| WO | WO 01/52478 | 7/2001 |

OTHER PUBLICATIONS

Marketing Brochure, Cannon Technologies, Inc., *Load Response Center*, 2003, pp. 2.

Marketing Brochure, Cannon Technologies, Inc., *Cannon Distribution Automation Systems*, pp. 1. 2003.

Marketing Brochure, Cannon Technologies, Inc., *Cannon 900 MHz Flex™ Paging Load Control Receiver*, 1999/2000, pp. 4.

Marketing Brochure, Cannon Technoloigies, Inc., *YUKON™ Software for Advanced Energy Services*, 2002.

Marketing Brochure, Cannon Technologies, Inc., *YUKON™ Energy Information Aggregation Curtailment Control for your largest customers*, 2002, can be located at website www.readmeter.com.

Marketing Brochure, Cannon Technologies, Inc., *YUKON™ Look how easy we've made load control*, 2002, can be located at website www.loadcontrol.com.

Marketing Brochure, Cannon Technologies, *YUKON™ Intelligent Monitoring and Notification*, 2003, can be located at website www.esubstation.com.

U.S. Appl. No. 10/922,120, Aug. 19, 2004, Cannon et al.
U.S. Appl. No. 11/491,769, Jul. 24, 2006, Rognli.
U.S. Appl. No. 11/978,933, Oct. 30, 2007, Cannon.

* cited by examiner

THERMOSTAT DEVICE WITH LINE UNDER FREQUENCY DETECTION AND LOAD SHEDDING CAPABILITY

PRIOR APPLICATION

This application is a divisional application of U.S. application Ser. No. 10/824,825 filed Apr. 15, 2004, now U.S. Pat. No. 7,242,114 entitled "Thermostat Device with Line Under Frequency Detection and Load Shedding Capability", and claims priority to U.S. Application Ser. No. 60/485,435, filed Jul. 8, 2003, entitled "Thermostat Device With Line Under Frequency and Line Under Voltage Protection", both of which are herein incorporated by reference.

RELATED APPLICATIONS

The present invention is related to co-pending applications assigned to the assignee of the present invention and entitled "Load Control Receiver with Line Under Voltage and Line Under Frequency Detection and Load Shedding", filed Feb. 25, 2004, Ser. No. 10/786,628, and "Utility Load Control Management Protocol", filed Aug. 20, 2003, Ser. No. 60/496,532, the disclosures of which are hereby incorporated by reference.

TECHNICAL FIELD

Generally, the present invention relates to a system and a method for providing a response to electric distribution power delivery disturbances related to under frequency events. In particular, load shedding close to the local disturbance is provided as it relates to under frequency events.

BACKGROUND OF THE INVENTION

Disturbances in the delivery of power to end user equipment are presently quite common. These disturbances may be brownout disturbances in which low power levels are delivered, or complete blackout situations in which no power is delivered. These disturbances occur for a variety of reasons but are frequently related to high demand situations (i.e., hot summer days when air conditioners and other end user equipment are run at peak levels) or delivery system equipment maintenance or failure.

Such disturbances that result in brownout or blackout situations can cause damage to end user equipment when voltage levels delivered to the equipment fall below required levels. This damage can cost end users a significant amount of money to either repair or replace the damaged equipment. Additionally, brownout or blackout situations cost utilities money and their own delivery system equipment may be damaged, requiring repair or replacement. Further, an isolated disturbance can affect a large number of end users if an entire subsystem load must be shed in response to the disturbance.

Some disturbances result in under voltage or under frequency events. An under voltage event occurs when a voltage level drops below a minimum or rated value. For example, electric consumer devices are frequently rated at 120 volts. While such devices may continue to operate uninterruptedly at values slightly below the rated voltage, the devices may be damaged or destroyed if the voltage delivered drops significantly, for example to 90 volts. Similarly, an under frequency event occurs when the frequency of a signal drops below a minimum or rated value. If an electronic device operates at a 60 Hertz signal, damage or destruction of the device may occur if the frequency drops to, for example, 40 Hertz. Some examples of systems that detect undervoltage and underfrequency conditions are disclosed and described in U.S. Pat. No. 3,993,984 to Penrod issued on Nov. 23, 1976, which is herein incorporated by reference. Consumers currently have no adequate way of protecting their equipment during under voltage or under frequency events.

Presently, systems exist in which utilities monitor and control end user equipment remotely to control load levels. These systems, however, are controlled by the utility and are primarily only used in peak demand situations. These systems typically do not operate to protect end user equipment in non-peak demand situations. Further, present systems may not provide a sufficiently rapid response to decreasing power delivery levels to protect end user equipment from damage; it may take a utility control center operator several minutes or more to respond to a system disturbance. Additionally, present systems may not operate to automatically shed load in under voltage or under frequency conditions to aid a utility in bringing the voltage or frequency back up to standard. One prior art system proposes to initiate load shedding via demand load control of air conditioning compressors and the like by lowering the frequency output at the utility thereby tripping frequency-sensitive switches located close to the load. For further details on such a system, reference is made to U.S. Pat. No. 5,687,139 to Budney issued Nov. 11, 1997, which is incorporated herein by reference.

There is a need in the industry for an apparatus or device that protects a consumer's end user equipment from electric distribution power delivery disturbances, primarily under frequency events, is located internally in end user equipment, and is automatic in its response, thereby substantially reducing the need for utilities to directly monitor end user equipment in instances of frequency drop offs.

SUMMARY OF THE INVENTION

The disturbance response apparatus of the present invention substantially meets the aforementioned needs of the industry. In one example embodiment, the disturbance response device of the present invention comprises a thermostat-type device that makes intelligent decisions that are local to the frequency disturbance to disconnect the end user in response to an under-frequency event in an electrical distribution system. Further, the apparatus of the present invention is able to respond quickly and efficiently to frequency disturbances, minimizing the overall impact of each disturbance on the equipment and helping a utility to bring the frequency or voltage back up to standard.

According to one example embodiment of the present invention, a line under frequency (LUF) detection and load shedding system and method measures the time period of each power line cycle and then compares the measured time period to a configurable (or utility-settable) trigger period. If the cycle time period (or length) is greater than or equal to the trigger period, a counter is incremented. If the cycle time period is less than the trigger period, the counter is decremented. If the counter is incremented to a counter trigger, an under-frequency condition is detected and the LUF response is implemented. The LUF response may be a command to control load but may also be some other command or commands that fit within the allocated space in the firmware. When the frequency rises above a restore value, an under-frequency counter begins to count down; when the under frequency counter reaches zero, an out response is initiated. This out response is typically to restore all loads, but it may also be some other command or commands that fit within the allocated space in the firmware.

According to another example embodiment of the present invention, an under frequency protection thermostat-type device is disclosed that includes a thermostat-type housing with a transformer adapted to be electrically connected to a primary voltage source having a predefined frequency level that is disposed within the housing. A line under frequency (LUF) detection and measurement module electrically connected to the transformer is adapted to detect a line under frequency condition from a signal received from the transformer. A microcontroller connected to the LUF detection and measurement module is adapted to send a command to disengage and engage an electrical load as a function of a measured frequency of the voltage source over a predefined period of time, wherein the measured frequency is compared to a predefined frequency threshold. A load switch connected to the microcontroller is adapted to respond to a command from the microcontroller to disengage and engage an electrical load from the voltage source.

According to yet another example embodiment of the present invention, a line under frequency detection system includes a microcontroller that is adapted to send a command to disengage and engage an electrical load as a function of a measured frequency of a voltage source over a predefined time period, wherein the measured frequency is compared to a predefined frequency threshold. The detection system also includes a level shift and limit module connected to the microcontroller and to the voltage source and a first memory arrangement adapted to provide a trigger period and a restore period that is connected to a comparator module within the microcontroller. The detection system further includes a crystal oscillator connected to the comparator module, wherein the comparator module is adapted to compare the time period to the trigger period for decreasing measured frequency and to a restore period for an increasing measured frequency. A second memory arrangement is also included in the detection system that is adapted to provide an under frequency count value to an under frequency counter within the microcontroller.

BRIEF DESCRIPTION OF THE DRAWINGS

The invention may be more completely understood in consideration of the following detailed description of various embodiments of the invention in connection with the accompanying drawings, in which.

Figure 1:
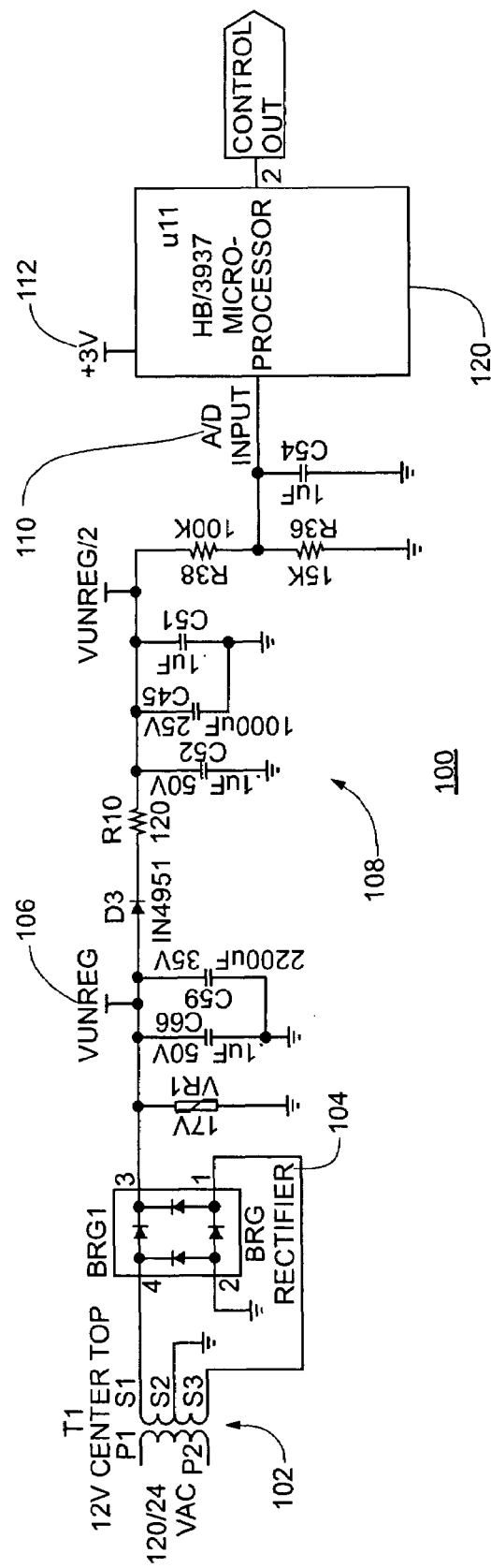
FIG. 1 is a schematic representation of a line under voltage (LUV) system of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

The disturbance response system of the present invention includes a line under voltage (LUV) system included within an end user climate control system. The LUV system enables a quick and efficient response to delivery system disturbances by identifying under voltage events. While the present invention is not necessarily limited to such an application, the invention will be better appreciated using a discussion of example embodiments in such a specific context.

Figure 2:
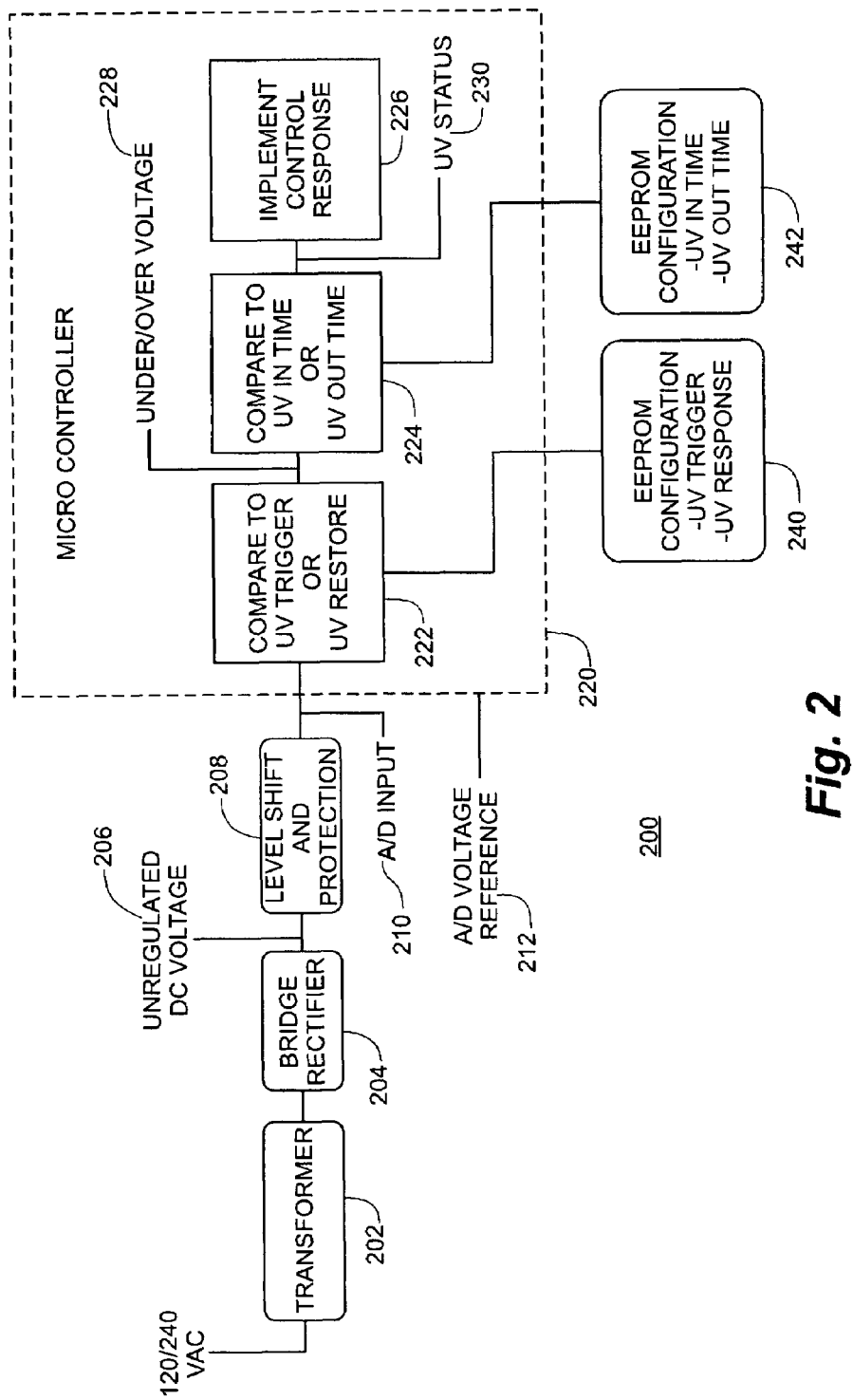
FIG. 2 is a simplified block diagram of the LUV system of the present invention.
Figure 11:
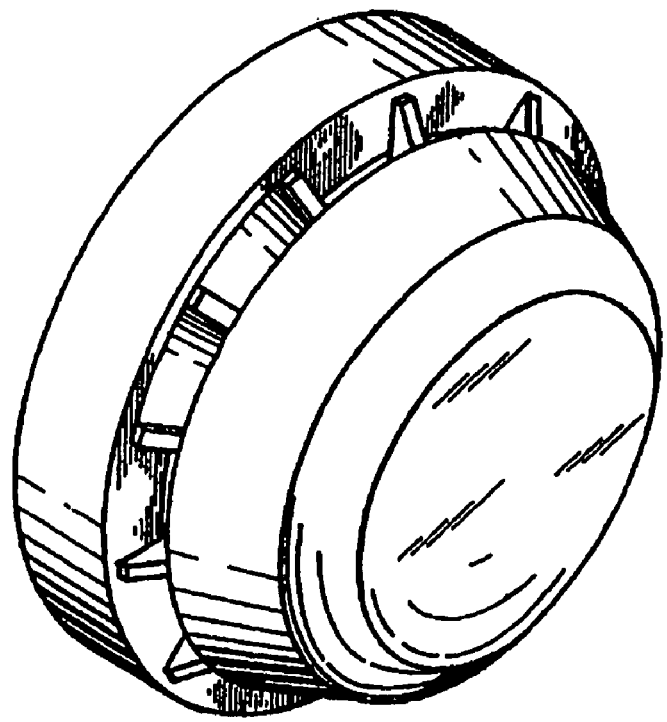
FIG. 11 is a left front perspective view of a thermostat of the prior art.
Figure 12:
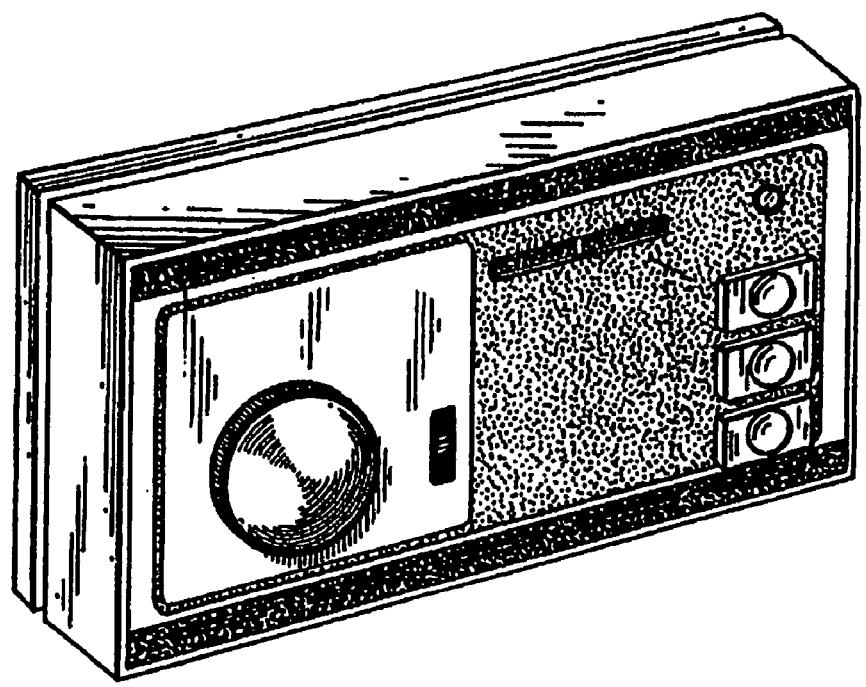
FIG. 12 is a front perspective view of a thermostat of the prior art.

Referring now to FIGS. 1 and 2, the line under voltage (LUV) system of the present invention includes a microcontroller that uses firmware (Appendix A-1: Firmware Code supporting the present invention (6 pages)) to detect an undervoltage event. Because firmware is used, various power-fail and power-restore points are configurable; the firmware is stored in ROM with the configurable variables stored in EEPROM. This LUV system is included in a load control device located within the end user climate control equipment and operates to detect power fail events. In one embodiment, the LUV system of the present invention may be included within a thermostat known in the art, for example the thermostats disclosed in U.S. Pats. D248,838 and D270,815 assigned to Honeywell, Inc. (see prior art FIGS. 11 and 12).

When a power-fail event occurs, the LUV system operates to make intelligent decisions, local to the disturbance, to disconnect the furnace or compressor to avoid damage to the units, and to shed load to help a utility bring the voltage back up to standard system-wide. In this example embodiment, the LUV/LUF system operates within the climate control system, to disconnect the heating or cooling units of the climate control system. Frequently the devices shed will be lower priority, higher consumption end user devices such as air conditioners and water heaters. The predetermined device can be a single electrical load, such as a single air conditioner in a home or a single transformer in a power distribution network, or any combination of a plurality of electrical loads such as in a home or in a power distribution network. When the voltage level increases to an acceptable level, the LUV/LUF modified load control receiver re-engages the heating or cooling units.

Referring back to FIG. 1, a diagram 100 illustrates one example embodiment of the line under voltage detection circuit of the present invention. FIG. 2 is a simplified block diagram 200 of under voltage detection circuit 100. A line undervoltage circuit 100 comprises a transformer 102 (or transformer 202 of FIG. 2) of electrically connected to a load such as an air compressor or furnace, a bridge rectifier circuit 104 (corresponding to bridge rectifier 204 in FIG. 2), an on regular DC voltage 106 (corresponding to DC voltage 206 of FIG. 2), and a level shift and protection circuit 108 (corresponding to level shift and protection circuit 208 of FIG. 2) that are electrically connected to microcontroller 120 (corresponding to microcontroller 220 of FIG. 2). The LUV detection system 200 further comprises an A-D input 210 (corresponding to A-D input 110 of FIG. 1), and an A-D voltage reference 212 (corresponding to A-D voltage reference 112 of FIG. 1) that serves as inputs to microcontroller 220. System 200 also comprises an EEPROM arrangement 240 adapted to provide a UV trigger and restore and a UV response and an EEPROM arrangement 242 adapted to provide a UV in time input and a UV out time input. Microcontroller 220 is comprised of a comparative module 222 that compares the UV trigger or the UV restore to the input from the level shift protector 208. Microcontroller 220 further includes a comparative module 224 which compares UV in time parameter or the UV out time parameter to the input from comparative module 222 and the under/overvoltage input 228. Modules 222 and 224 further have as inputs EEPROM arrangements 240 and 242. Microcontroller 220 further includes an implement control response module 226 which has as its inputs comparative module 224 and a UV status 230. The operation of line undervoltage detection system 200 will become clearer with the discussion of FIGS. 3A-5.

Figure 3A:
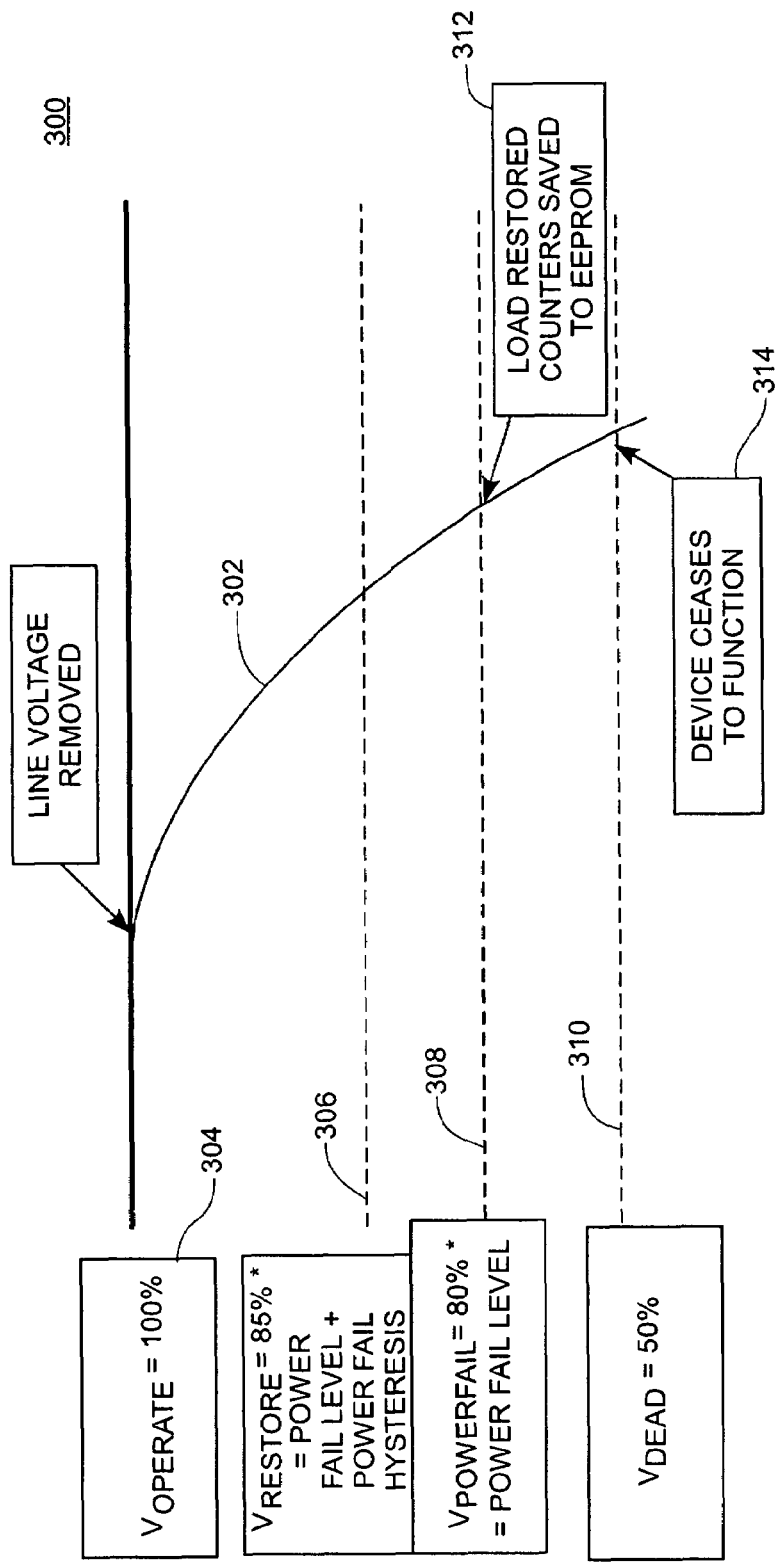
FIG. 3A is a graph depicting a typical power fail curve exhibited in an electrical system.
Figure 3B:
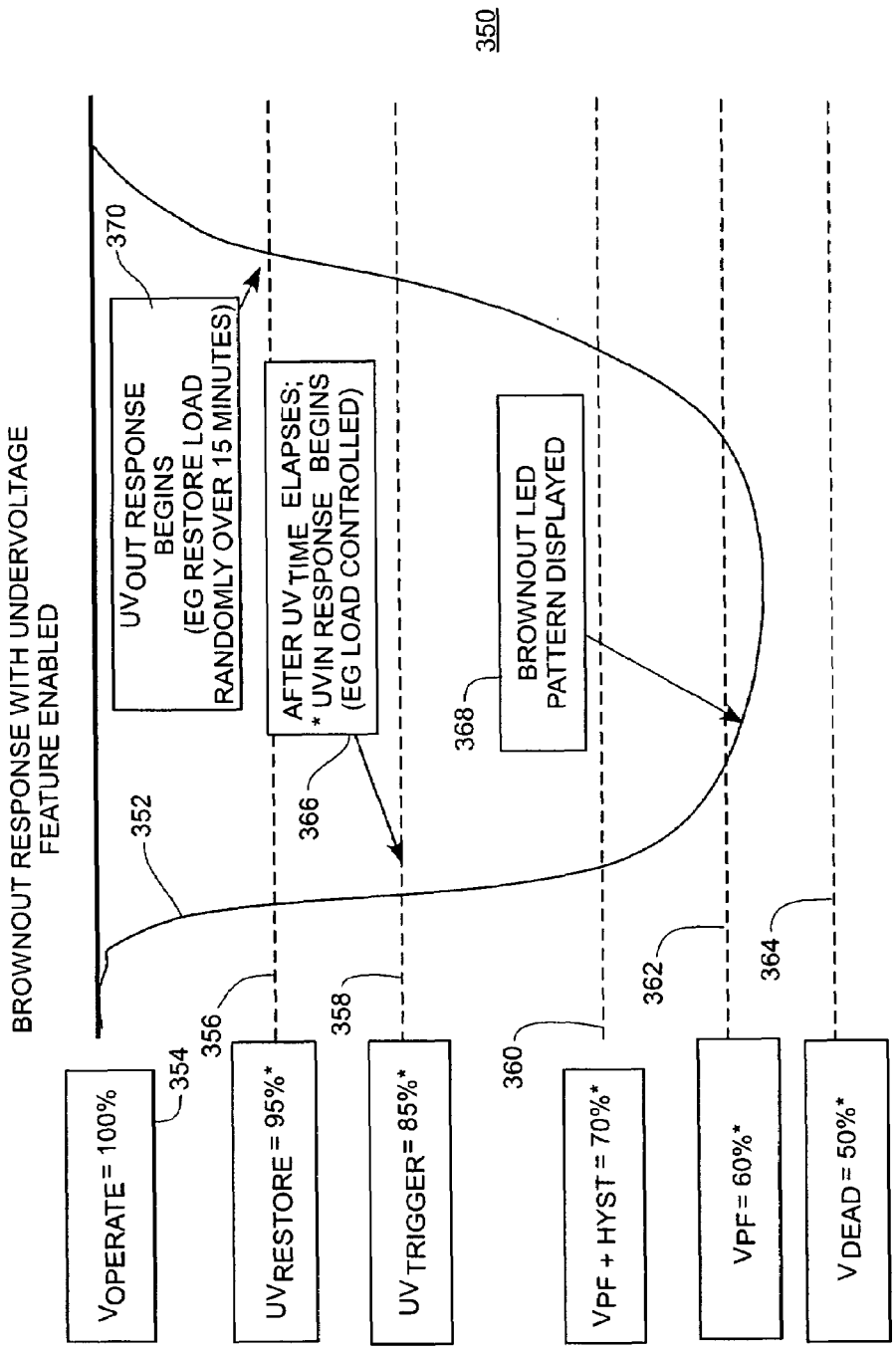
FIG. 3B is a graph depicting a brownout response of a device with the LUV system enabled.

Referring now to FIGS. 3A and 3B, a typical powerfail response curve 302 is graphically depicted in graph 300 of FIG. 3A with various threshold points that represent a percentage of total voltage. Operating voltage is at 100% denoted as 304; the restore voltage level is denoted as 306 (at about 85% level). In FIG. 3B, a brownout response 350 is graphically depicted with various power-fail and power-restore trigger points along a voltage line 352 shown at selected values. The vertical axis of graph 300 shows voltage points or thresholds along with their typical values as a percentage of nominal voltage, while the horizontal axis shows time. Thresholds marked with an (*) are configurable. Curve 302 shows a changing voltage over time and flags key responses of the device. Though $V_{powerfail}$ (80% voltage level, indicated as 308) seems to be significantly above $V_{dead}$ (50% voltage level, indicated as 310) such a difference gap is necessary to allow time for the microprocessor to react to the powerfail under all conditions. When two 30A relays are installed, for example, the operating voltage will fall rapidly when the line is removed.

Detection of Power Failure

If the line voltage drops below 80% of nominal line voltage, the microprocessor prepares itself for a perceived outage. To protect the microprocessor from line voltage oscillation, microprocessor start-up occurs when line voltage reaches 85% of nominal line voltage. When a power fail is detected, critical counters are immediately saved to EEPROM (indicated as 312) and a CRC is calculated over the entire protected RAM. At below threshold 310, the device ceases to function, as indicated as point 314. Subsequently, if the line voltage is normal (i.e. a glitch occurred), then normal operation is resumed. If the line voltage is not normal (but the processor is still running) then this is a brownout state. The error LEDS report the brownout. When the brownout finishes, and normal voltage returns, the processor will then be reset.

Power fail is detected by sampling the power supply with an analog to digital converter. The line is sampled every 2 ms; the sampled value is called the Power Reading with a value in the range of 00-FF. If the Power Reading is less than Power Fail Level (discussed below) then it is considered a power failure. The Power Fail Level parameter should be configured to be at 80% of nominal line voltage. The Power Fail Level is the power fail reading that will cause the power fail routines to be activated (1 byte). For this parameter, the ExpressCom Configuration Command Code is 3A (Hex). A value of 00h or FFh disables powerfail detection (this should only be used by an unprogrammed EEPROM in manufacture).

The power fail state is exited, and normal operation resumed, when the Power Reading rises above the combined Power Fail Level+Power Fail Hysteresis level (discussed below). The combined value should be configured to be at 85% of nominal line voltage. The lowest Power Reading sampled (since its last reset) is displayed in the serial data stream. The Power Reading is dependent both on the input AC voltage and on the number and type of relays that are controlled. The Power Fail Hysteresis level is reached when the power fail reading rises above the combined Power Fail Level+Power Fail Hysteresis, at which time the device can exit power failed mode. The ExpressCom Configuration Command Code for this threshold is 3A (Hex).

For a printed circuit board with a single 5A relay, which is controlled, the power readings at various voltages are:

| Voltage (VAC) | % of 120 VAC | Power Reading (1 × 5A relay active) |
|---|---|---|
| 120 | 100 | 7D |
| 115 | 96 | 75 |
| 110 | 92 | 6D |
| 105 | 88 | 64 |
| 100 | 83 | 5C |
| 95 | 79 | 53 |
| 90 | 75 | 4A |
| 85 | 71 | 42 |
| 80 | 67 | 39 |
| 75 | 63 | 30 |
| 70 | 58 | 27 |
| 65 | 54 | 22 |
| 60 | 50 | will not run |

In operation, a power-fail is detected by sampling the power supply with an analog-to-digital converter every two milliseconds to obtain a power reading. When it reaches a trigger level and stays below the trigger level for the specified amount of time, an under-voltage response is triggered. This under-voltage response is typically a command to control load but may be any command or commands that fit in the allocated space in the firmware. If a power reading is below the specified power fail level, it is considered a power failure and the power-fail routines of the LUV system are activated. When it reaches the power-fail level and stays below the power-fail level for the specified amount of time, a brownout LED pattern is displayed.

As depicted in FIG. 3B, if the power does not decrease to the point where the CPU ceases to function but instead rises to the restore level, the device may exit the under voltage mode by initiating an under voltage-restore response. The under voltage-restore response is typically a command to restore load randomly over fifteen minutes but may be any command or commands that fit in the allocated space in the firmware.

Undervoltage Detection Parameters

Because the LUV system uses firmware rather than hardware to detect powerfail, the powerfail points are configurable. In a preferred embodiment, the under voltage feature is enabled with a single 5A relay. This will provide sufficient response time for the microprocessor to manage powerfails. In this example embodiment, the operating voltage is indicated as 354, the UV restore is indicated as 356, the UV trigger is indicated as 358, the combination of the powerfail and hysteresis voltage is indicated as 360, the $V_{powerfail}$ is indicated as 362 and is set at about 60% to provide for a sufficient response time while $V_{restore}$ is set at about 70% for the recovering part of curve 352. As the voltage source quality begins to drop (as indicated in curve 352), at point 366 after the UV time period has elapsed, the UV in response mode begins, wherein the load is controlled. As the voltage source continues to deteriorate (further along curve 352), at point 368, the brownout LED pattern is displayed, indicating that the voltage level is well below the powerfail voltage level of 60% and the system is about to transition to a totally inactive state. As the voltage source begins to recover (indicated on curve 352), at point 370 the UV outresponse begins (e.g., restore load randomly over 15 minutes).

Figure 4:
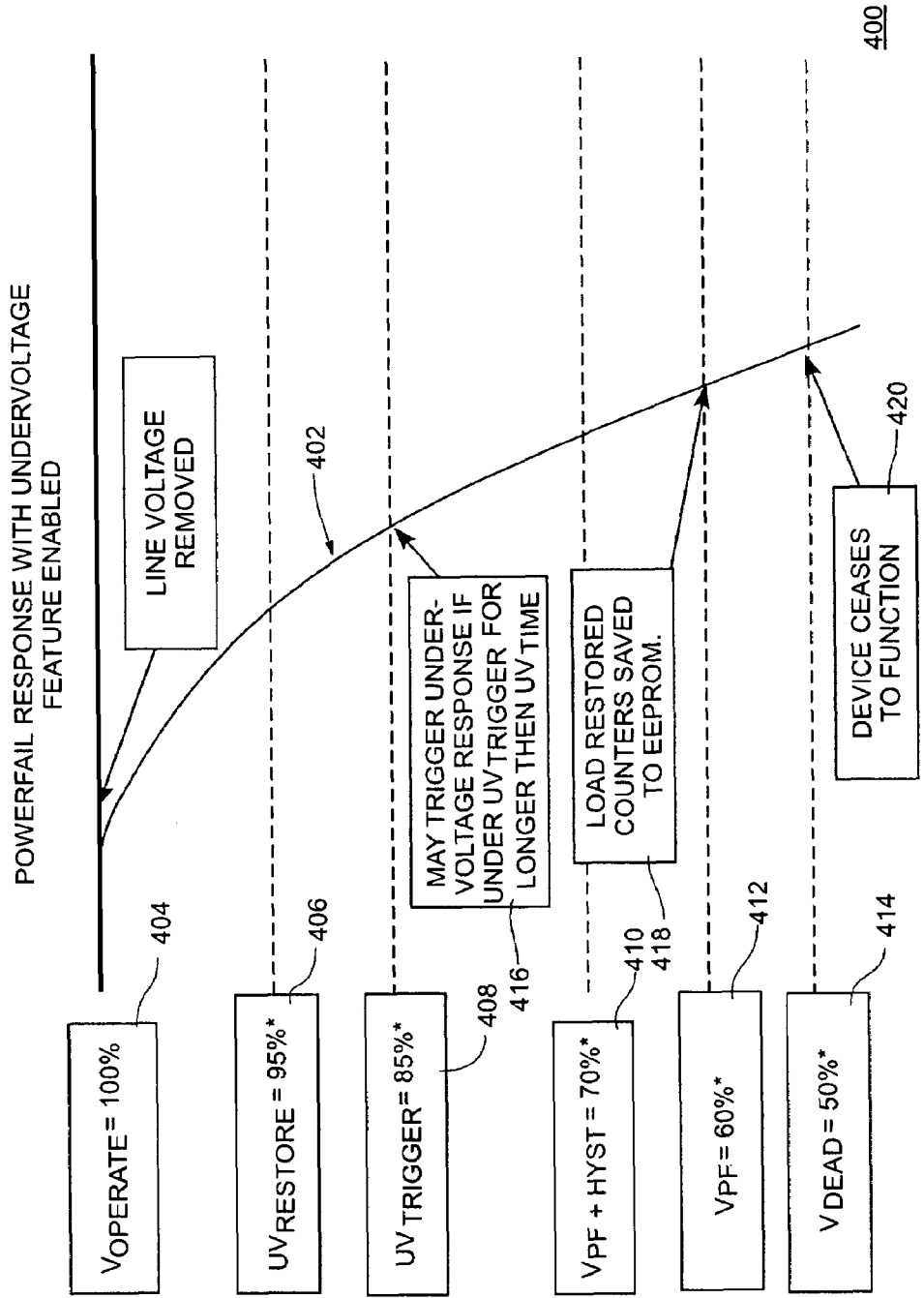
FIG. 4 is a graph depicting a power fail response of a device with the LUV system enabled.
Figure 5:
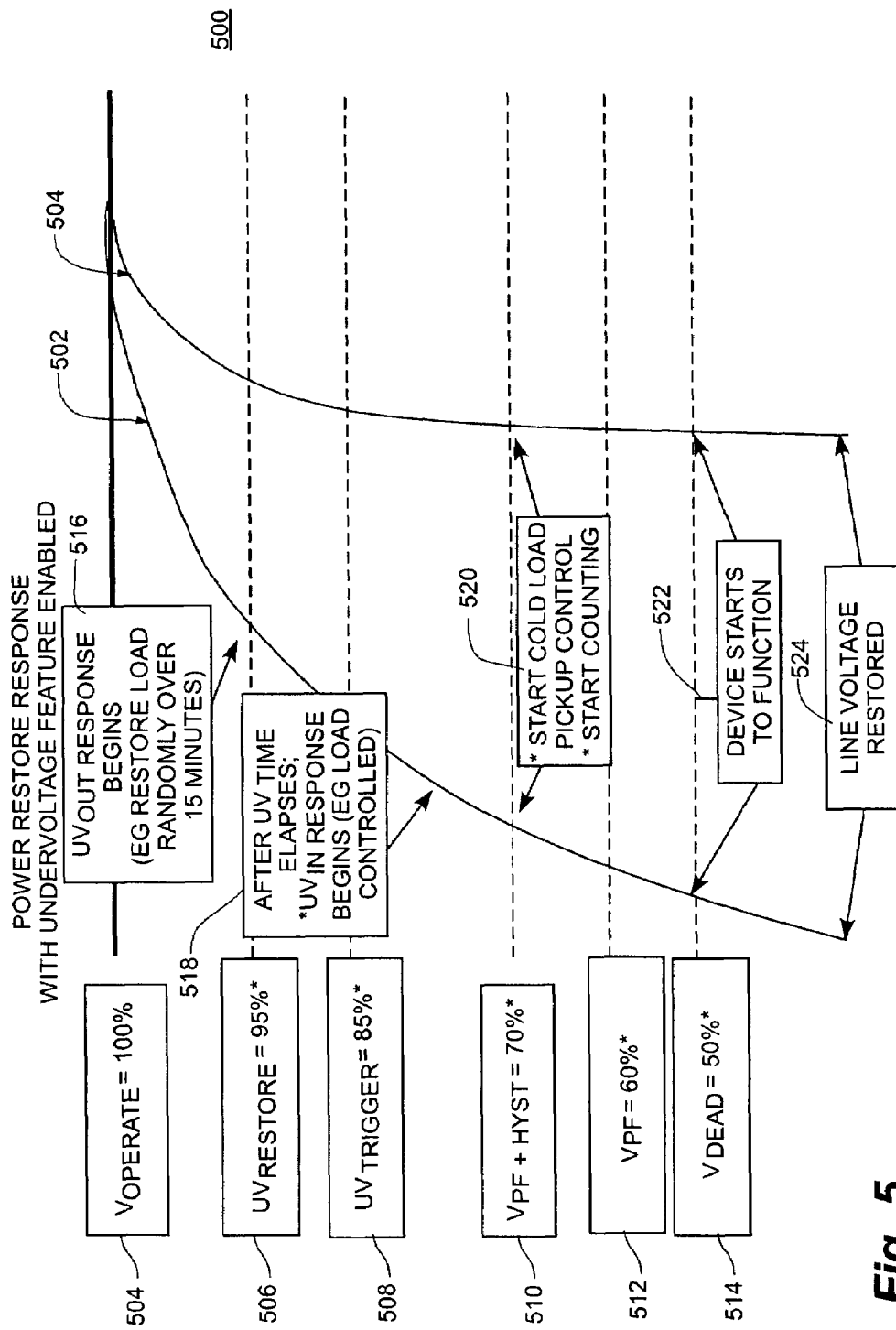
FIG. 5 is a graph of a power restore response of a device with the LUV system enabled.

Not only are the following parameters configurable, but they correspond to each other in FIGS. 3B, 4 and 5 for ease of description (e.g., FIG. 4, parameters or thresholds 404 through 414 area associated with the definitions provided below):

$UV_{trigger}$ is the voltage at which under voltage 'in response' is triggered (e.g. 85% level). This is also the power fail reading which will cause the under voltage response to trigger (1 byte). The ExpressCom Configuration Command Code for this parameter is 41 (Hex).

$UV_{restore}$ is the voltage at which the under voltage condition is finished, and the 'out response' begins (e.g. 95% level). This is also the power fail reading which will cause the under voltage response to restore (1 byte). The ExpressCom Configuration Command Code for this parameter is 41 (Hex).

$UV_{in\ time}$ is the length of time that the voltage must be continuously under the $UV_{trigger}$ threshold to cause an under voltage response ($UV_{in\ response}$), which is in the range of 0-130 seconds in 2 ms increments. This is necessary so that momentary spikes (caused by air conditioner compressors starting, for example) don't cause an under voltage response. This is also the time (in 2 ms increments) that the power fail reading must be less than UV Trigger value or threshold so as to trigger a UV response (1 byte). The ExpressCom Configuration Command Code for this parameter is 41 (Hex).

$UV_{out\ time}$ is the length of time that the voltage must be continuously over the $UV_{restore}$ to exit an under voltage condition and cause an $UV_{out\ response}$ (0-130 seconds in 2 ms increments). This is also the time (in increments of 2 ms) that the power fail reading must be above UV Restore to cause a UV restore (1 byte). The ExpressCom Configuration Command Code for this parameter is 41 (Hex).

$UV_{in\ response}$ is the ExpressCom command to perform when an under voltage condition begins (e.g. shed relay for (up to) to hours). This is typically a command to control all loads, but may be any ExpressCom command(s) that fits within 16 Nibbles. The ExpressCom command commences with the MessageType and includes the MessageData. Multiple commands can be specified, if they fit (e.g., control all loads for 255 hours 08,20,FF).

$UV_{out\ response}$ is the ExpressCom command to perform when exiting an under voltage condition (e.g. restore relay 1 randomly over the next 15 minutes). If the under voltage response is not configured ($UV_{trigger}=0$) then the power line will continue to behave exactly as illustrated in FIG. 3A. This is typically a command to restore all loads, but may be any ExpressCom command(s) that fits within 16 Nibbles. The ExpressCom command commences with the MessageType, and includes the MessageData. Multiple commands can be specified, if they fit (e.g., restore all loads randomly over 15 minutes; 09,80,0F).

LUF_UV_Response is the parameter that determines what response occurs if LUF and LUV features are activated together.

Bit 0: If set then LUF IN response may occur while UVStatus non-zero.

Bit 1: If set then UV I response may occur while LUFStatus non-zero.

Bit 2: If set then LUF OUT response may occur while UVStatus non-zero.

Bit 3: If set then UV OUT response may occur while LUFStatus non-zero.

So, a value of 05h means that LUF response takes priority over UV response, and a value of OAh means UV response takes priority over LUF response. The UVStatus is kept in RAM. It is 00 if the device is not in an under voltage condition, and 01 if it is has triggered an under voltage response.

UV Counter is the Line Under Voltage Counter that is incremented each time the UV Status changes from 'Normal' to 'UnderVoltage.' It may be cleared by a Counter Reset command. The Counter Reset Command can also 'freeze' the UV Counter by copying its value to the Frozen UV Counter.

Frozen UV Counter is the Frozen Line Under Voltage Counter that is set by the Extended Counter Command which can 'freeze' the UV Counter by copying the UV Counter value to the Frozen UV Counter.

Referring now to FIGS. 4 and 5, various power-fail and power-restore points 400 are graphically depicted with selected values or thresholds (404-414, see above for definitions) that appear along response line 402. In operation, a power-fail is detected by sampling the power supply such that if a power reading is below the specified power-fail level, it is considered a power failure and the power-fail routines of the LUV system are activated. In this example embodiment, after the voltage source drops below the UV Trigger level 408 (85% voltage level) this may trigger at point 416 an under voltage response if the voltage is under UV Trigger for longer than the UV Time. As the voltage level continues to drop, at point 418 the load restored counter values are saved to one of the EEPROMs. After the voltage level drops to below 50% of the nominal voltage, the device at point 420 ceases to function.

Referring now more particularly to FIG. 5, a power-restore response 500 is illustrated graphically with both a slow power restoration 502 and a fast power restoration 504. In this example embodiment, the microprocessor of microcontroller 220 exhibits an internal response for both a slow and fast power restoration indicated by curves 502 and 504. In both cases the load is disabled when the power is restored. This example embodiment addresses the event where the power is restored into an under voltage condition. In graph 500, parameters 504-514 are similar to those discussed in FIG. 4; however restoration curves 503 and 504 exhibit similar restoration characteristics until reaching the voltage threshold at point 510. At this juncture, curve 502 illustrates how the LUV system enables other parameters that affect the re-engagement of various loads.

The line voltage is restored at point 524 for both restoration schemes and at point 522 the LUV system of the load control receiver device starts to function. At point 520, both restoration curves start a cold load pickup control and a counter starts counting. At this point, curve 504 progresses quickly to full restoration and re-engagement of loads. Curve 502, on the other hand, progresses more slowly such that at point 518 a UVIn Response begins (and the load is controlled0 after the UV time elapses. When the power increases sufficiently, a UVout response is triggered at point 516. This out response is typically a command to restore load randomly over fifteen minutes but may be any command or commands that fit in the allocated space in the firmware.

In a related embodiment, the disturbance response system of the present invention can also include a line under frequency (LUF) detection and load shed system operating within an end user climate control system. The LUF detection system enables a quick and efficient response to delivery system disturbances by identifying under frequency events and disconnecting the load.

Figure 6:
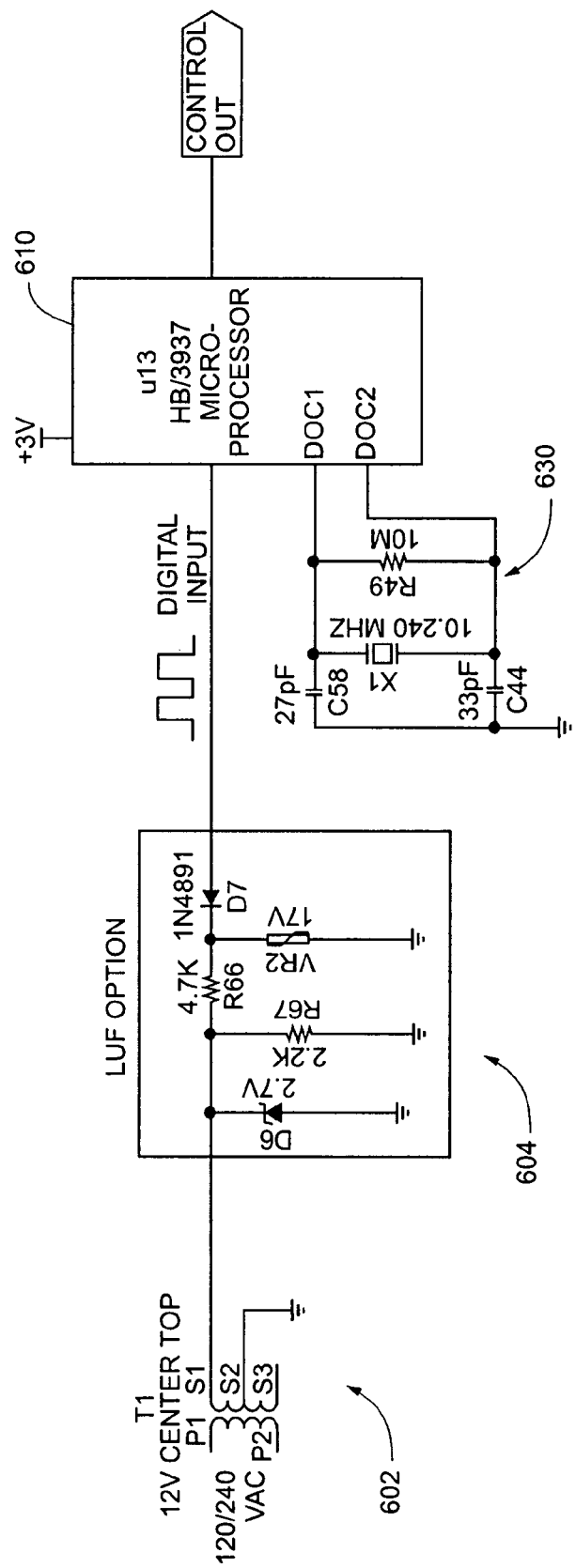
FIG. 6 is a schematic representation of a line under frequency (LUF) detection circuit of the present invention.
Figure 7:
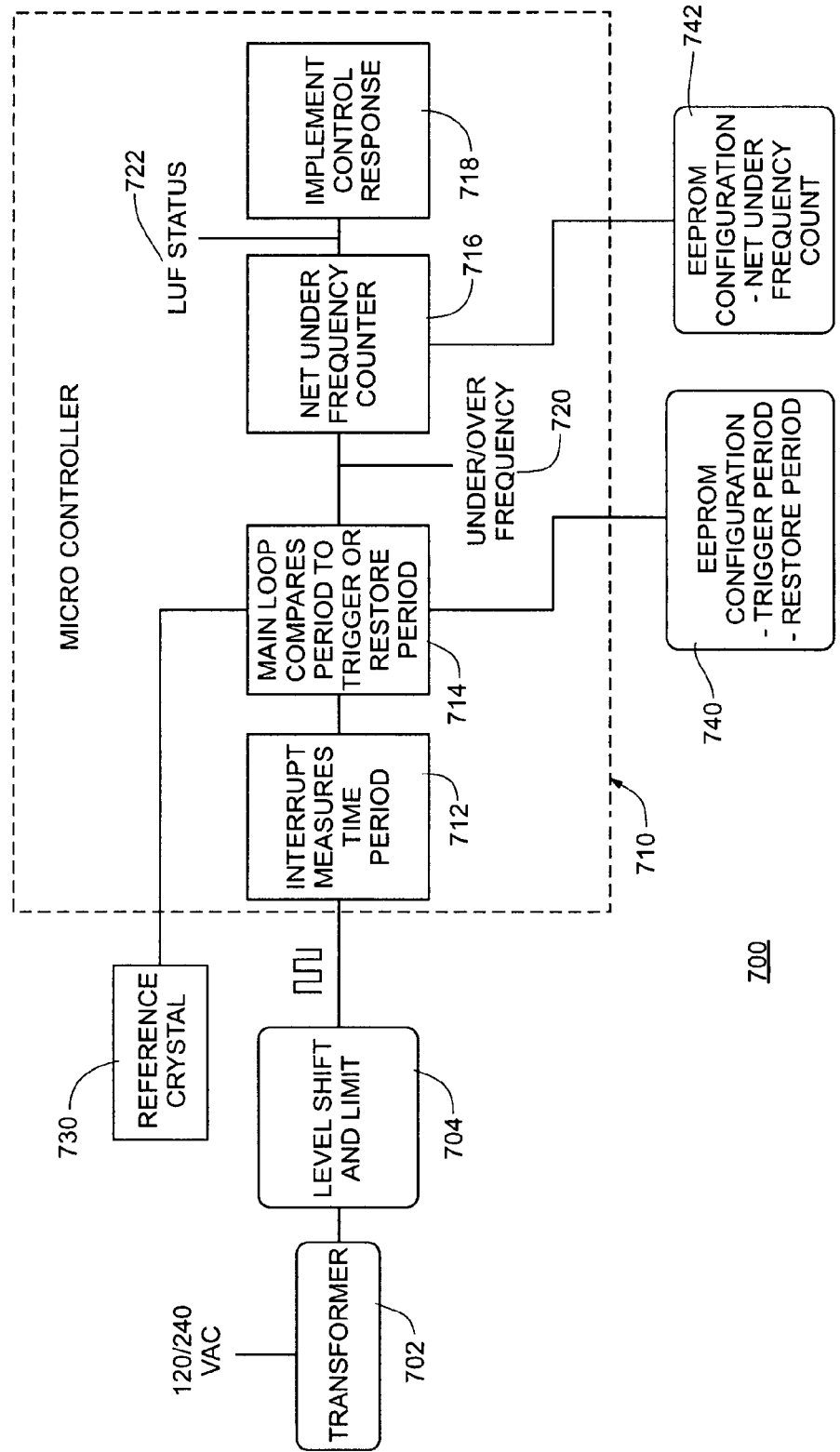
FIG. 7 is a simplified block diagram of the LUF system incorporating the LUF detection circuit of FIG. 6.
Figure 8:
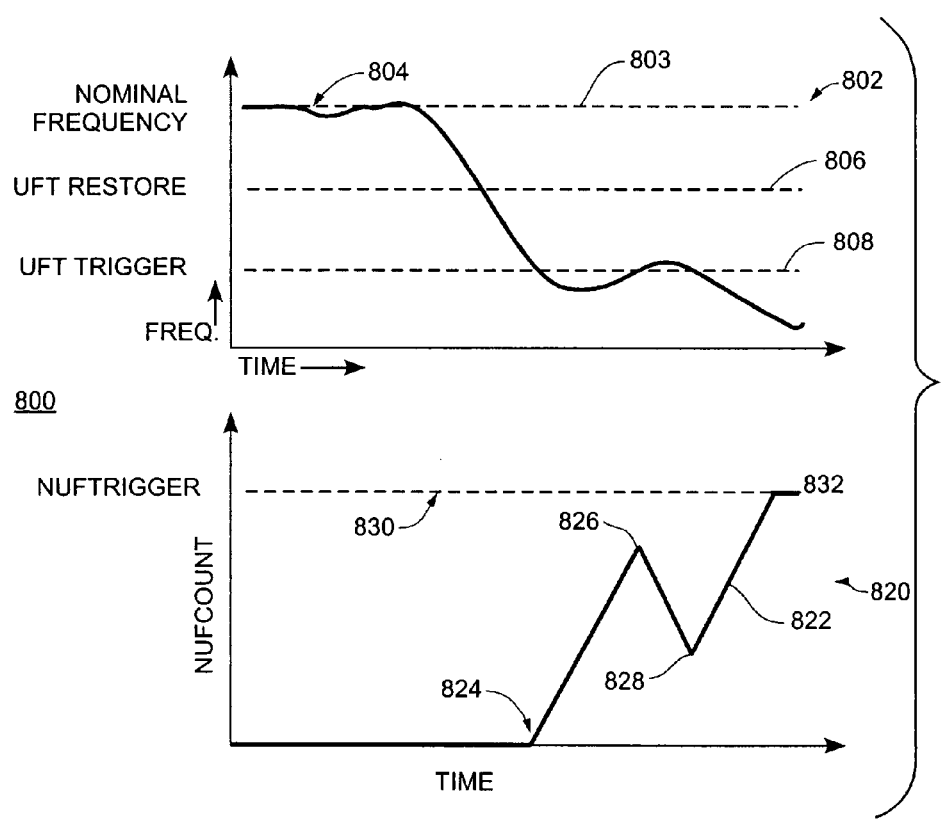
FIG. 8 is a graph of a normal operation of a device exhibiting LUF characteristics and an example of trigger points in the graph confirming the underfrequency condition detectable by the LUF system of the present invention.
Figure 9:
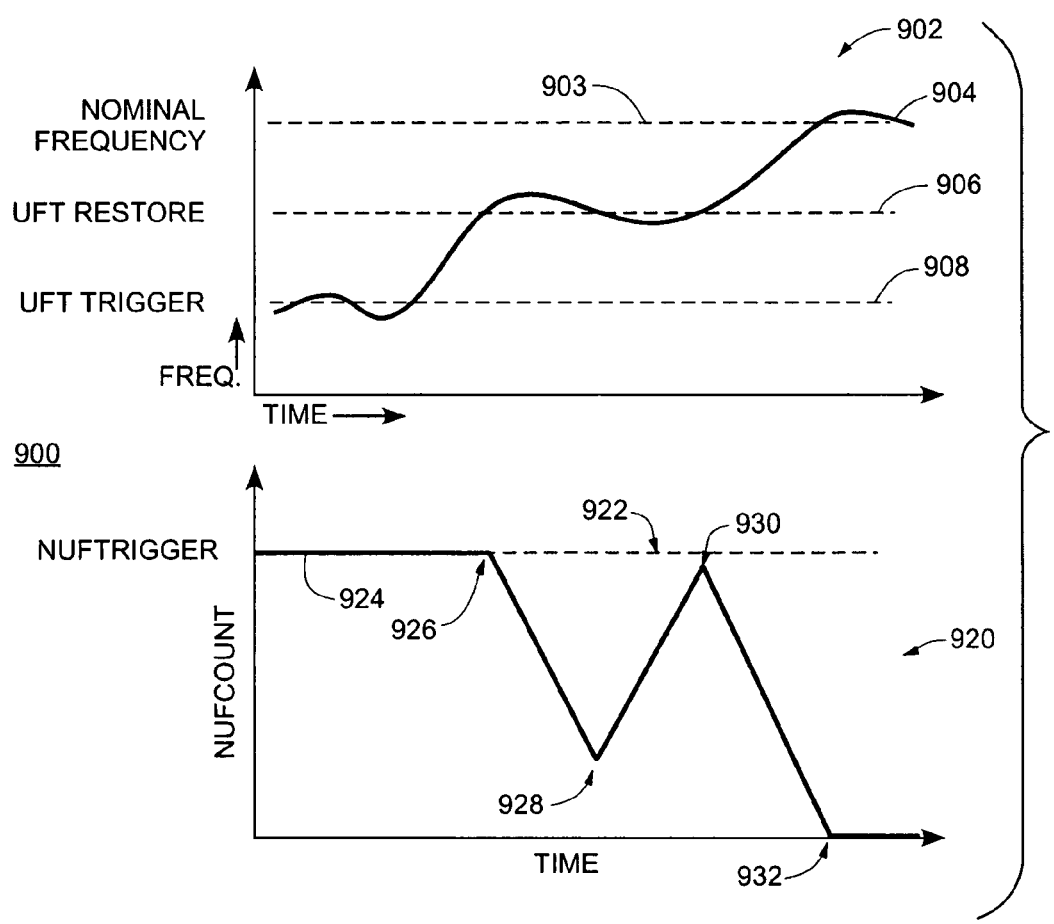
FIG. 9 is a graph of a device recovering from the under frequency condition that is tracked by the LUF system of the present invention.
Figure 10:
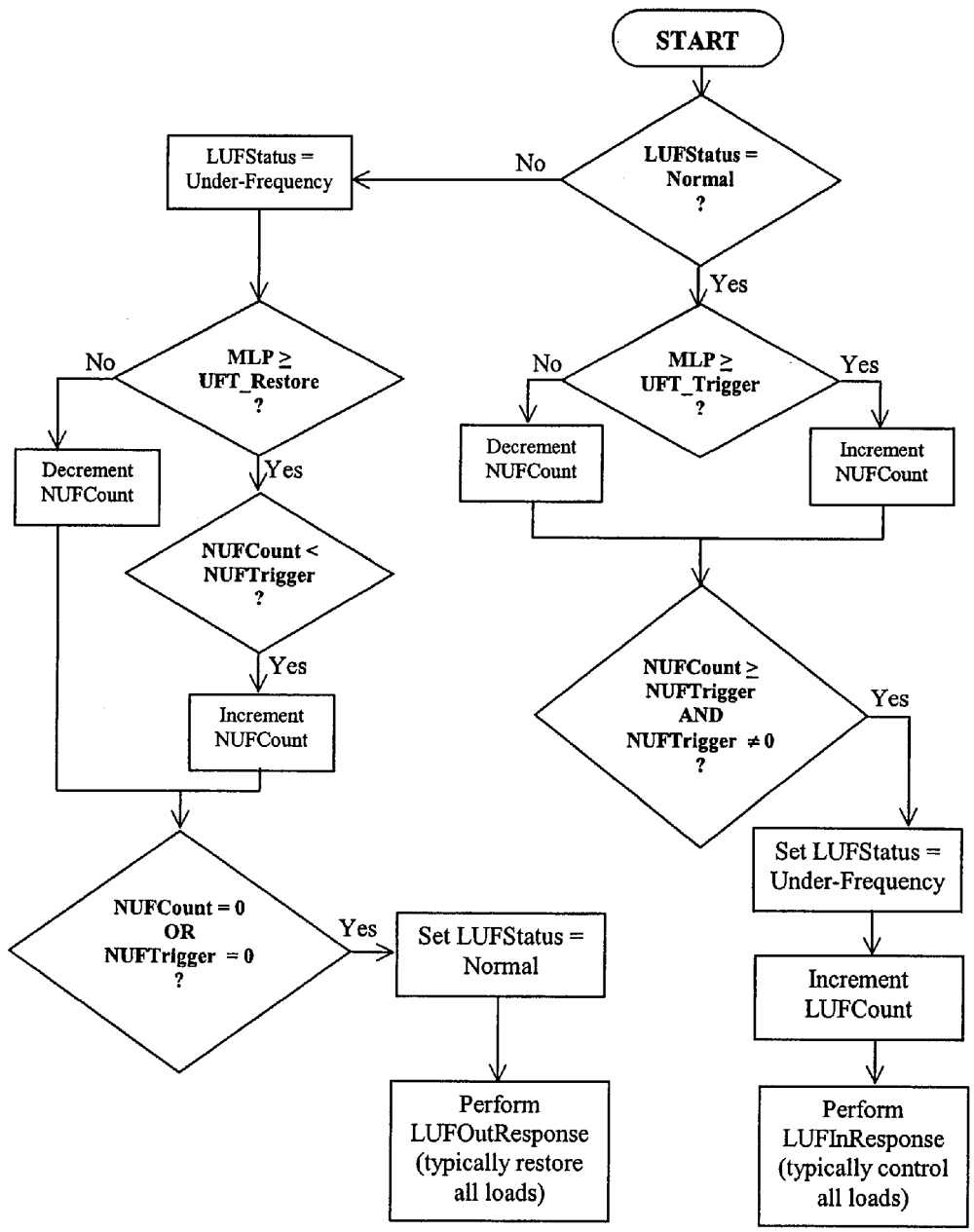
FIG. 10 is an operation algorithm for each power line cycle of the LUF system of the present invention.

Referring now to FIGS. 6-10, FIG. 6 illustrates one example embodiment of a line under frequency (LUF) detection circuit 600 that operates in a similar manner to the LUV detection circuit discussed above. FIG. 7 is a simplified block diagram of one embodiment of a line under frequency detection system 700 that incorporates LUF detection circuit 600. FIG. 8 is a graph 800 of a normal operation of a device exhibiting LUF characteristics and an example of trigger points in the graph confirming the underfrequency condition detectable by the LUF system of the present invention. FIG. 9 is a graph 900 of a device recovering from the under frequency condition that is tracked by the LUF system of the present invention. FIG. 10 is an operation algorithm 1000 for each power line cycle of the LUF system of the present invention.

In summary, the LUF detection and load shed system of the present invention executes pre-loaded commands in response to line under frequency conditions. The LUF system is included in a load control device located within an end user climate control system and operates to detect power fail events and to disconnect loads in response to the power fail events. In one example embodiment, the LUF detection system of the present invention is incorporated into a thermostat device of the type known in the art, such as the thermostats disclosed in U.S. Pats. D248,838 and D270,815 assigned to Honeywell, Inc. (see prior art FIGS. 11 and 12). When a power-fail event occurs, the LUF system, similar to the LUV system above, operates to make intelligent decisions, local to the disturbance, to disconnect the furnace or compressor to avoid damage to the units. Load-shedding by the thermostat-type module aids the utility in bringing the frequency back up to standard system-wide.

In this example embodiment, the LUF detection and load shed system incorporated into the thermostat module or shell operates within the consumer's climate control system to disconnect the heating or cooling units of the climate control system. Once the line frequency increases to an acceptable level and crosses a predefined threshold, the LUF-modified thermostat module re-engages the heating or cooling units. The LUF detection system determines the line frequency status of each power line cycle by counting the ticks on an internal timer between two successive zero-crossing falling edges of the power line. The LUF detection system of the present invention includes a microcontroller and firmware stored in a ROM with configurable variables being stored in an EEPROM.

In this example embodiment, the LUF detection system of the present invention measures the time period of each power line cycle and then compares the measured time period to a utility-settable (or configurable) trigger period. If the cycle length is greater than or equal to the trigger period, a counter is incremented. If the cycle is less than the trigger period, the counter is decremented. If the counter is incremented to a counter trigger, an under-frequency condition is detected and the LUF response is implemented. The LUF response may be a command to control load but may also be some other command or commands that fit within the allocated space in the firmware. When the frequency rises above a restore value, an under-frequency counter begins to count down. When the underfrequency counter reaches zero, an out response is executed that typically restores or re-engages all loads, but it may also be some other command or commands that fit within the allocated space in the firmware.

Referring now more specifically to FIGS. 6 and 7, line under frequency circuit 600 comprises a transformer 602 (or transformer 702 of FIG. 7) electrically connected to a load such as an air compressor or a furnace, a line under frequency option circuit 604 (corresponding to a level shift and limit module 704) as well as a crystal oscillator circuit 630 (corresponding to reference crystal 730) that are electrically connected to microcontroller 610 (corresponding to microcontroller 710). The LUF detection system 700 further comprises an EEPROM arrangement 740 adapted to provide a Trigger period and a Restore period and an EEPROM arrangement 742 adapted to provide a Net Under Frequency Count. Microcontroller 710 is comprised of an interrupt module 712 that measures the Time period and a comparator module 714 that is coupled to reference crystal 730 and to EEPROM arrangement 740, which is adapted to be a main loop that compares the Time Period to either the Trigger or Restore period. In addition, microcontroller 710 includes a Net Under Frequency Counter 716, which is connected to comparator module 714 and receives Net Under Frequency Count data from EEPROM arrangement 742, and a Control Response module 718 that is connected to Counter 716. Microcontroller 710 provides taps 720 and 722 to verify the Under/Over Frequency state and the LUF Status of LUF detection system 700. The operation of detection system 700 will further described in connection with the discussion of FIGS. 8-10, which illustrates the frequency of the line varying over time.

Referring to FIG. 8 in more detail, under normal conditions the nominal frequency for most systems is about 60 Hz (threshold 803, equivalent to 21315 counter reading), as indicated in graph 802, on line 804, at Time=0. In this state, the line under frequency status is equal to zero (LUF Status=0) as no line under frequency detection is being performed. Graph 802 further illustrates thresholds 806 and 808 representing an under frequency restore threshold (UFT Restore) and an under frequency trigger threshold (UFT Trigger). In this example embodiment, the UFT Restore threshold if about 59.9 Hz (counter reading 21351) and the UFT Trigger threshold is about 59.8 (counter reading 21387). Graph 820 tracks the corresponding Net Under Frequency Count, as represented by line 822, of frequency line 804 in graphing NUF Count as a function of time. For each sample taken of the line frequency the length of the cycle is compared to the UFT Trigger. If the cycle length is greater or equal to the Trigger, than NUF Count is incremented; if the cycle length is less than the Trigger than NUF Count is decremented. If the NUF Count reaches NUF Trigger, then an under frequency condition has been detected and then the LUF-In Response is implemented and the LUF Status is set.

In this example embodiment, when the frequency is at 60 Hz the NUF Count is initialized to zero. As the frequency line 804 drops below UFT Trigger 808, NUF Count starts counting up (see line 824). NUF Count starts to decrement in count at point 826 when frequency line 804 climbs above Trigger 808 and then resumes counting up at point 828 when frequency line 804 drops below Trigger 808 again. An NUF Trigger threshold 830 is defined on graph 820 as the point where the LUF detection system will signal that there is an under frequency condition. If the NUF Count reaches NUF Trigger at point 832, then an under frequency condition has been detected. At this point, LUF Status changes from 0 to 1 and the LUF-In Response is implemented and the LUF Status is set.

Referring now to FIG. 9, as in FIG. 8 the nominal frequency is represented by threshold 903 (equivalent to 21315 counter reading), as indicated on line 904. Note that frequency line 904 is at an under frequency condition and therefore the line under frequency status is equal to one (LUF Status=1). Graph 902 illustrates thresholds 906 and 908 representing the under frequency restore threshold (UFT Restore) and the under frequency trigger threshold (UFT Trigger), where the UFT Restore threshold is about 59.9 Hz (counter reading 21351) and the UFT Trigger threshold is about 59.8 Hz (counter reading 21387). Graph 920 tracks the corresponding Net Under Frequency Count, as represented by line 924, of frequency line 904 in graphing NUF Count as a function of time. Once the LUF Status is set, then each cycle is compared to UFT Restore. If the under frequency cycle length or time period is greater then or equal to the trigger, then NUF Count is incremented; if the cycle length is less than the trigger than NUF Count is decremented. If NUF Count reaches zero, then the under frequency condition has ceased and then the LUFOut Response is implemented and the LUF Status is cleared. The NUF Count is always in the range of 0. NUF Trigger.

In this example embodiment, as the frequency is below 59.8 Hz the NUF Count is at the same value as the NUF Trigger 922. As the frequency line 904 rises above UFT Trigger 908, NUF Count starts counting down (see line 924). NUF Count starts to decrement in count at point 926 when frequency line 904 climbs above Trigger 908 and then resumes counting up at point 928 when frequency line 904 drops below UFT Restore 906. An NUF Trigger threshold 922 is defined on graph 920 as the point where the LUF detection system signaled that there was an under frequency condition. If the NUF Count reaches zero at point 932, then an under frequency condition has ceased. At this point, LUF Status changes from 1 to 0 and the LUF-Out Response is executed and the LUF Status is reset.

As described earlier, the Line Under Frequency (LUF) system of the present invention executes pre-loaded commands in response to line under-frequency conditions. Two different conditions are possible: LUF In and LUF Out. The LUF system determines the line frequency status of each power line cycle by counting the 'ticks' on an internal timer between two successive zero-crossing falling edges of the power line. The LUF detection system of the present invention correlates the Tick count with a Time period to generate a frequency calculation. The table below provides examples of this correlation:

TABLE 1

LUF TIMER TICKS
(The internal timer has a resolution of 781.914 ns per tick)

| Tick Count | Period | Frequency |
| --- | --- | --- |
| 21,209 | 16.58 ms | 60.3 Hz |
| 21,315 | 16.67 ms | 60.0 Hz |
| 21,351 | 16.69 ms | 59.9 Hz |
| 21,387 | 16.72 ms | 59.8 Hz |
| 21,422 | 16.75 ms | 59.7 Hz |

In particular, the LUF system compares the period of each power line cycle to a utility-settable (or utility configurable) under frequency threshold trigger (UFT). The microcontroller then increments or decrements a Net Under Frequency counter (NUFCount) based on the frequency of the selected power line cycle. The internal "Tick" calculations are performed on the cycle periods, wherein the Period=1/frequency. For each power line cycle, the LUF module 604 measures the length of the cycle in ticks (781.914 ns per tick). Therefore, a smaller tick count corresponds to a smaller time period, which translates to a higher frequency. The frequency detection hardware of the present invention has a resolution of about +0.1 Hz for any given frequency sample, but over several frequency samples the software can accurately detect an under frequency condition.

Internal and Configurable LUF Variables

The MLP (Measured Line Period) is calculated for each power line cycle. At cold start, the NUFCount is cleared and it is incremented if the MLP of a particular power line cycle is greater than the UFT. If the MLP is less than the UFT, then the NUFCount is decremented. The LUF Status is an internal flag indicating the current line under-frequency status (0=Normal, 1=Under-Frequency). At cold start, LUF Status is set to Normal but the setting changes to Under-Frequency when NUF Count reaches the NUF Trigger threshold. It changes back to Normal when NUF Count reaches zero. This provides hysteresis in the system.

The configurable variables/parameters of the present invention include: NUF_Trigger, UFT_Trigger, UFT_Restore, LUFInResponse and LUFOutResponse. Each will be described in more detail as follows.

UFT_Trigger—This parameter is the Under Frequency Threshold Trigger to trigger the LUF State (in units of 'Ticks' as explained above). The Under Frequency Threshold sets the dividing point determining whether each power line cycle is considered a 'Normal' cycle or an 'Under-Frequency' cycle. The UFT value may be set between 0000 and FFFF. For this parameter the ExpressCom Configuration Command Code is 3D (Hex).

UFT_Restore—This parameter is the Under Frequency Threshold Restore to exit LUF State, where UFT_Restore≦UFT_Trigger (in "Tick" units). The Under Frequency Threshold sets the dividing point determining whether each power line cycle is considered an 'Under-Frequency' cycle or a 'Normal' cycle. The UFT value may be set between 0000 and FFFF. For this parameter the ExpressCom Configuration Command Code is 3D (Hex).

NUFTrigger—The Net Under Frequency Trigger parameter sets the NUFCount value at which the LUFInResponse is activated. The lower the NUFTrigger, the faster the LUFInResponse occurs during an under-frequency condition. If the NUFTrigger is zero, then the Line Under Frequency routines are disabled. For this parameter the ExpressCom Configuration Command Code is 3F (Hex).

LUFIn Response—The Line Under Frequency In Response is activated when the NUFCount reaches the NUFTrigger value while the LUFStatus is 'Normal'. The LUFInResponse is typically a command to control all loads, but may be any ExpressCom command(s) that fits within 16 Nibbles. The ExpressCom command commences with the MessageType, and includes the MessageData. Multiple commands can be specified, if they fit. If this does not contain a valid ExpressCom command (eg all zeroes) then no response is implemented. eg, control all loads for 255 hours 08,20,FF. For this parameter the Expresscom Configuration Command Code is 3E (Hex).

LUFOut Response—The Line Under Frequency Out Response is activated when the NUFCount reaches the zero value while the LUFStatus is 'Under-Frequency'. The LUFOutResponse is typically a command to restore all loads, but may be any ExpressCom command(s) that fits within 16 Nibbles. The ExpressCom command commences with the MessageType and includes the MessageData. Multiple commands can be specified, it they fit. If this does not contain a valid ExpressCom command (e.g., all zeroes) then no response is implemented (e.g., restore all loads randomly over 15 minutes 09,80,0F). For this parameter the ExpressCom Configuration Command Code is 3E (Hex).

LUFCounter—The Line Under Frequency Counter is incremented each time the LUFStatus changes from 'Normal' to 'UnderFrequency'. It may be cleared by a Counter Reset command. The Counter Reset Command can also 'freeze' the LUFCounter by copying its value to the Frozen-LUFCounter.

FrozenLUFCounter—The Frozen Line Under Frequency Counter is set by the Extended Counter Command which can 'freeze' the LUFCounter by copying the LUFCounter value to the FrozenLUFCounter.

LUF_UV_Response—This parameter determines what response occurs if LUF and LUV features are activated together in the detection system.

Bit 0: If set then LUF IN response may occur while UVStatus non-zero.

Bit 1: If set then UV IN response may occur while LUFStatus non-zero.

Bit 2: If set then LUF OUT response may occur while UVStatus non-zero.

Bit 3: If set then UV OUT response may occur while LUFStatus non-zero.

So, a value of 05h means that LUF response takes priority over UV response, and a value of OAh means that UV response takes priority over LUF response.

Referring now to FIG. 10, an operation algorithm is described for an electrical system that is either in Normal mode (LUF Status=0) or in Under Frequency mode (LUF Status=1). Measurements are taken for each power line cycle and the values of various data parameters are compared. Where LUF Status is Normal and if the Measured Line Period (MLP) is greater than or equal to the value of the UFT_Trigger, than the NUFCount is incremented; otherwise, the NUF Count is decremented. If the NUF Count is greater than or equal to NUFTrigger and NUFTrigger is of a non-zero value, then the LUF Status is set to Under-Frequency (LUF Status=1); the LUF Count is incremented and an LUFInResponse is performed (typically all loads are controlled).

Where the electrical system is in a state of Under-Frequency (LUF Status=1) and MLP is greater than or equal to UFT_Restore and further where NUFCount is less than NUFTrigger, then the LUF system increments NUFCount. The LUF system decrements NUFCount where the MLP value is less than UFT_Restore and where NUFCount is greater than NUFTrigger. Where NUFCount is zero or NUFTrigger is zero, then LUF Status is se to Normal and the LUF system performs an LUFOutResponse, which typically restores all loads previously disconnected.

In the various embodiments described above, the power-fail and power-restore responses for the LUF system are controlled by the thermostat-type device, thereby not requiring monitoring by an electrical utility operator. This enables the thermostat-type device to respond to under-frequency events very quickly, usually within seconds, so as to protect valuable heating or cooling equipment and aid utility recovery on a system-wide basis. Further, the thermostat-type device may be either communicating or non-communicating. In a communicating embodiment, various parameters of the thermostat-type device and its operation can be enabled or disabled over the air. The thermostat-type device can use a number of wireless communications techniques including, but not limited to, radio frequency (RF) and Bluetooth (short distance RF) to communicate with the various HVAC units in and around the home. In a non-communicating embodiment, local under frequency protection is provided by the thermostat-type device without over-the-air communications capability. In a related embodiment, the under frequency protection thermo stat-type device need not include the transformer and the load control switch within the housing. The device can be connected to the externally located transformer and load switch.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed is:

1. An under frequency protection thermostat-type device comprising:
   a thermostat-type housing;
   a transformer adapted to be electrically connected to a primary voltage source having a predefined frequency level and disposed within said housing;
   a line under frequency (LUF) detection and measurement module electrically connected to the transformer and adapted to detect a line under frequency condition from a signal received from the transformer;
   a microcontroller connected to the LUF detection and measurement module and adapted to send a command to disengage and engage an electrical load as a function of a measured frequency of the voltage source over a predefined period of time, wherein the measured frequency is compared to a predefined frequency threshold; and
   a load switch connected to the microcontroller adapted to respond to a command from the microcontroller to disengage and engage an electrical load from the voltage source.

2. An under frequency protection thermostat-type device comprising:
   a thermostat-type housing;
   a transformer disposed within said housing;
   a line under frequency (LUF) detection and measurement module electrically connected to the transformer and adapted to detect a line under frequency condition from a signal received from the transformer;
   a microcontroller connected to the LUF detection and measurement module and adapted to send a command to disengage and engage an electrical load as a function of a measured frequency of the voltage source over a predefined period of time, wherein the measured frequency is compared to a predefined frequency threshold.

3. The device according to claim 2, wherein the transformer is adapted to be electrically connected to a primary voltage source having a predefined frequency level.

4. The device according to claim 2, further comprising a load connected to the microcontroller and adapted to respond to a command from the microcontroller to disengage and engage an electrical load from the voltage source.

5. The device of claim 2, wherein the LUF detection module is adapted to determine the line frequency status of each power line cycle by counting ticks on an interval timer between two successive zero-crossing falling edges of the power line, thereby generating the measured frequency of the voltage source.

6. The device of claim 2, wherein the microcontroller sends a command to disengage the load when the measured frequency over the predefined period of time is below the frequency threshold and sends a command to engage the load when the measured frequency is above the frequency threshold.

* * * * *